US011394598B2

(12) United States Patent
Tanimura (10) Patent No.: US 11,394,598 B2
(45) Date of Patent: Jul. 19, 2022

(54) SPECTROPHOTOMETRIC DEVICE (71) Applicant: Konica Minolta, Inc., Chiyoda-ku (JP)

(72) Inventor: Yasutaka Tanimura, Nara-shi-Nara (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/667,537

(22) Filed: Oct. 29, 2019

(65) Prior Publication Data

US 2020/0136886 A1 Apr. 30, 2020

(30) Foreign Application Priority Data

Oct. 30, 2018 (JP) .............................. JP2018-203707

(51) Int. Cl.
H04L 12/00 (2006.01)
H04L 61/00 (2022.01)
H04L 69/16 (2022.01)
G01N 21/25 (2006.01)

(52) U.S. Cl.
CPC .. H04L 29/12009 (2013.01); H04L 29/06095 (2013.01); G01N 21/251 (2013.01)

(58) Field of Classification Search
CPC ......... H04L 29/12009; H04L 29/06095; H04L 67/125; H04L 61/2567; G01J 3/46; G01N 21/251
USPC ........................... 709/223, 227; 370/235, 475
See application file for complete search history.

(56) References Cited

U.S. PATENT DOCUMENTS

| 6,363,886 | B1* | 4/2002 | Statton | A01K 39/014 |
| | | | | 119/51.5 |
| 6,625,124 | B1* | 9/2003 | Fan | H04L 29/12009 |
| | | | | 370/235 |
| 6,765,674 | B2 | 7/2004 | Orelli et al. | |
| 2004/0233429 | A1* | 11/2004 | Taylor | G01J 3/46 |
| | | | | 356/319 |
| 2007/0047585 | A1* | 3/2007 | Gillespie | H04L 29/12311 |
| | | | | 370/475 |

FOREIGN PATENT DOCUMENTS

| JP | S 63-235832 | 9/1988 | |
| JP | 2002-369167 | 12/2002 | |
| JP | 2007-028001 | 2/2007 | |
| JP | 2015-077208 | 4/2015 | |
| JP | 2016-538567 | 12/2016 | |
| WO | WO-0031951 A1 * | 6/2000 | ........... H04L 69/169 |
| WO | WO-2014005432 A1 * | 1/2014 | ......... H04L 41/0816 |
| WO | WO 2015/040110 | 3/2015 | |

* cited by examiner

Primary Examiner — Frantz Coby
(74) Attorney, Agent, or Firm — Cozen O'Connor (57) ABSTRACT A spectrophotometric device includes a photoreceptor that receives light reflected from an object. The spectrophotometric device measures a color of the object. The spectrophotometric device further includes: a network connection medium being capable of connecting to one or more than one address on a network; a connection interface element; and a processor that makes the network connection medium connect to the one or more than one address on the network upon the interface element being used by a user.

10 Claims, 13 Drawing Sheets

SPECTROPHOTOMETRIC DEVICE

The disclosure of Japanese Patent Application No. 2018-203707 filed on Oct. 30, 2018, including description, claims, drawings, and abstract, is incorporated herein by reference in its entirety.

BACKGROUND

Technological Field

The present invention relates to a spectrophotometric device that measures the colors of an object by measuring the colors of light being reflected from the object.

Description of the Related Art

It is quite common for printing factories, for example, to ensure product quality by measuring the colors of their print products on a regular basis and managing the output colors of their printers. In such a printing factory, original image data called "color test chart" is printed by a printer from original image data and each color patch of the color test chart is measured by a photometric device (for example, refer to U.S. Pat. No. 6,765,674). The gap between the measured value and the desired value about each color patch is calculated and the output colors of the printer are corrected with reference to the calculated gaps.

The color test chart is a template having multiple sample colors called "color patches". Usually, these color patches represent different fundamentals of color (hue, lightness, and saturation) and are arranged in a predetermined manner.

Workmen conventionally have filled the role of color management using an original color chart and their keen sense of color; nowadays more and more photometric devices take the place of them for high-precision color management.

Nowadays, there is an increasing demand for the capability of unified color management of printing factories that sit far away from each other and there is an increasing demand for the capability of unified color management of multiple printers and unified color management of printers provided from different manufacturers.

Moreover, there is an increasing demand for the capability of remotely monitoring color management correction in a printing factory.

It is quite common to share, via the Internet, information such as colorimetric data, values to feed back to the printer, date and times of correction, which brings the capability of unified color management of printing factories that sit far away from each other.

However, the user is required to obtain colorimetric data, values to feed back to a printer, date and times of correction, and other information only by operating a conventional spectrophotometric device or a terminal (user terminal) that is constituted by a personal computer (PC); the user is thus bothered by operating back and forth a spectrophotometric device, a PC, and a cloud server.

Furthermore, the spectrophotometric device may be compact like palm-sized, and such compact spectrophotometric devices is not supposed to be capable of having a sophisticated manipulation or display device.

SUMMARY

The present invention, which has been made in consideration of such a technical background as described above, is a spectrophotometric device which allows the user to easily and directly connect to a target address such as a user terminal or a cloud server without the need of having a sophisticated manipulation or display device.

A first aspect of the present invention relates to a spectrophotometric device including a photoreceptor that receives light reflected from an object, the spectrophotometric device for measuring a color of the object, the spectrophotometric device further including:

a network connection medium being capable of connecting to one or more than one address on a network;

a connection interface element; and a processor that makes the network connection medium connect to the one or more than one address on the network upon the interface element being used by a user.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
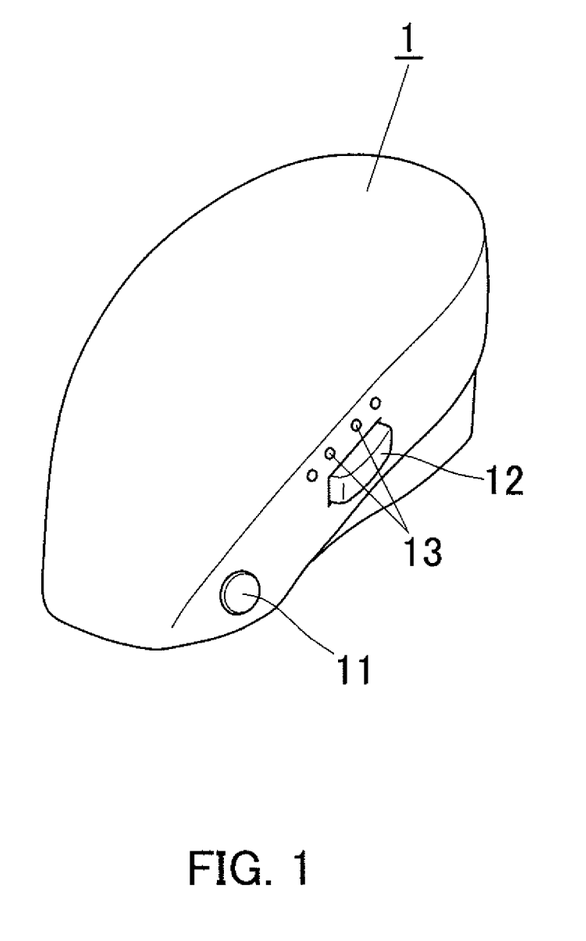
FIG. 1 is a perspective view illustrating the exterior of a spectrophotometric device according to one embodiment of the present invention.

FIG. 1 is a perspective view illustrating the exterior of a spectrophotometric device 1 according to one embodiment of the present invention. The spectrophotometric device 1 is formed in a mouse, having an opening (not shown in the figure) on the undersurface of the spectrophotometric device 1 itself; the opening allows measurement of the colors of an object. The spectrophotometric device 1 has the function of measuring the colors of the object by measuring the colors of light being reflected from the object through the opening.

Disposed on a side of the spectrophotometric device 1 are a power switch 11 and a connect button (corresponding to a connection interface element) 12; arranged above the connect button 12 are a plurality of indicators 13 that are constituted by light-emitting diode (LED) lamps, for example.

The power switch 11 serves to turn on and off the power of the spectrophotometric device 1. The connect button 12 serves to make the spectrophotometric device 1 connect to the target address on the network; the connect button 12 further serves to switch the target address in the case in which there is more than one address available. In this embodiment, the connect button 12 is constituted by a pressure-sensitive switch; alternatively, the connect button 12 may be constituted by a touch-sensitive switch. The connect button 12 is one in FIG. 1; alternatively, there may be more than one the connect button 12 as described later.

Upon the target address being changed, the indicators 13 indicate the target address which the spectrophotometric device 1 will connect to. In this embodiment, the indicators 13 are configured such that one of the lamps blinks to mean a connection to the corresponding address is in process and one of the lamps stays on to mean a connection to the corresponding address is currently made.

Figure 2:
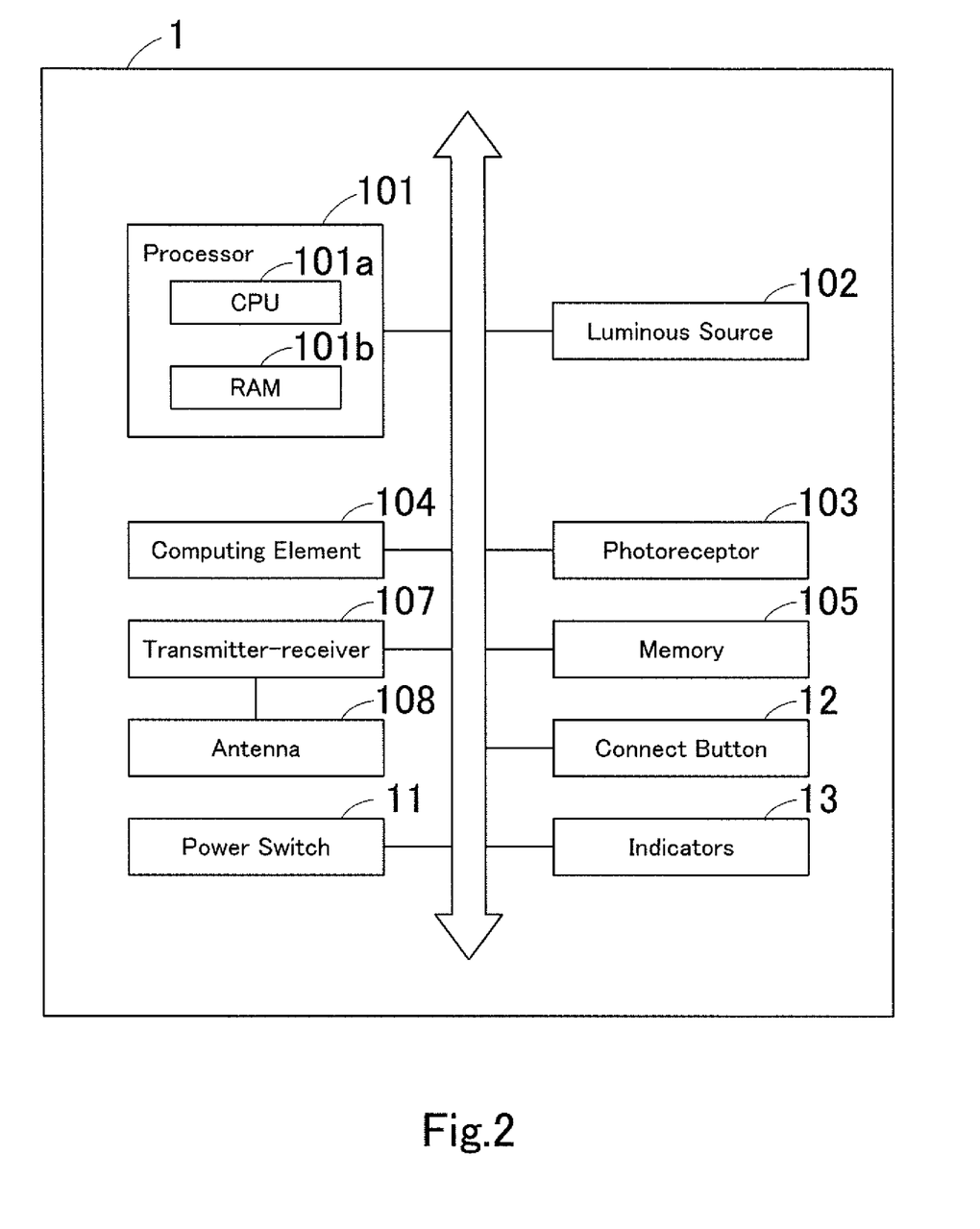
FIG. 2 is a block diagram illustrating a configuration of a spectrophotometric device according to one embodiment of the present invention.

FIG. 2 is a block diagram illustrating a configuration of the spectrophotometric device 1 according to one embodiment of the present invention. The spectrophotometric device 1 is essentially provided with: a processor 101; a luminous source 102; a photoreceptor 103; a computing element 104; a memory 105; a transmitter-receiver 107; and an antenna 108, in addition to the power switch 11, the connect button 12, and the indicators 13 previously described with reference to FIG. 1.

The processor 101 controls the spectrophotometric device 1 in a unified and systematic manner; the processor 101 is provided with a CPU 101a and a RAM 101b. The CPU 101a executes the functions of the spectrophotometric device 1 by operating in accordance with operation programs stored on the memory 105. The RAM 101b is a memory that provides a workspace for the CPU 101a to operate in accordance with the operation programs.

The luminous source 102 serves to emit light to an object; the photoreceptor 103 serves to receive the light reflected from the object. Here, only one type of light may be available or multiple types of light may be available such that one of them can be selected.

By measuring the colors of the reflected light received by the photoreceptor 103, the computing element 104 performs computations for color measurement in a heretofore known method. In this embodiment, the computing element 104 serves as a part of the CPU 101a of the processor 101. After the connection to an external apparatus is made, in this embodiment, the transmitter-receiver 107 transmits colorimetric results obtained by the computing element 104 to the external apparatus. The transmitter-receiver 107 may transmit, instead of colorimetric results obtained by the computing element 104, optical data obtained by the photoreceptor 103 to the external apparatus. In the case in which the spectrophotometric device 1 transmits optical data obtained by the photoreceptor 103 to an external apparatus, the external apparatus performs computations for color measurement.

The memory 105 is constituted by a non-volatile memory such as a flash memory, a NAND-type flash memory, or an E2ROM; the memory 105 may be installed inside the processor 101. The memory 105 essentially stores computation results obtained by the computing element 104 and address information to connect to external apparatuses such as user terminals (user PCs) and cloud servers. The address information represents IP addresses, URLs, and sets of an ID and a password to access, for example. The processor 101 requests the memory 105 for the information and connects to the network through the transmitter-receiver 107 using the information.

The transmitter-receiver 107 (corresponding to a networking means) is a network interface that wirelessly connects to the target address using a wireless local area network (wireless LAN) and the antenna 109 and that transmits and receives data over the connection.

In this embodiment, the spectrophotometric device 1 may connect to the target address on the network in a wired manner instead of in a wireless manner. Actually, the user is usually required to measure the colors of an object e.g. a color test page by the spectrophotometric device 1 while repositioning the spectrophotometric device 1 repeatedly on the object. Furthermore, the user usually uses the spectrophotometric device 1 in an assigned workplace in a printing factory, which is not spacious in the generality. For all the above reasons, the user would have to mind the connectivity more in a wired network circumstance. And thus, the use of the spectrophotometric device 1 in a wireless network circumstance is preferred for the sake of a user-friendly solution.

Figure 3:
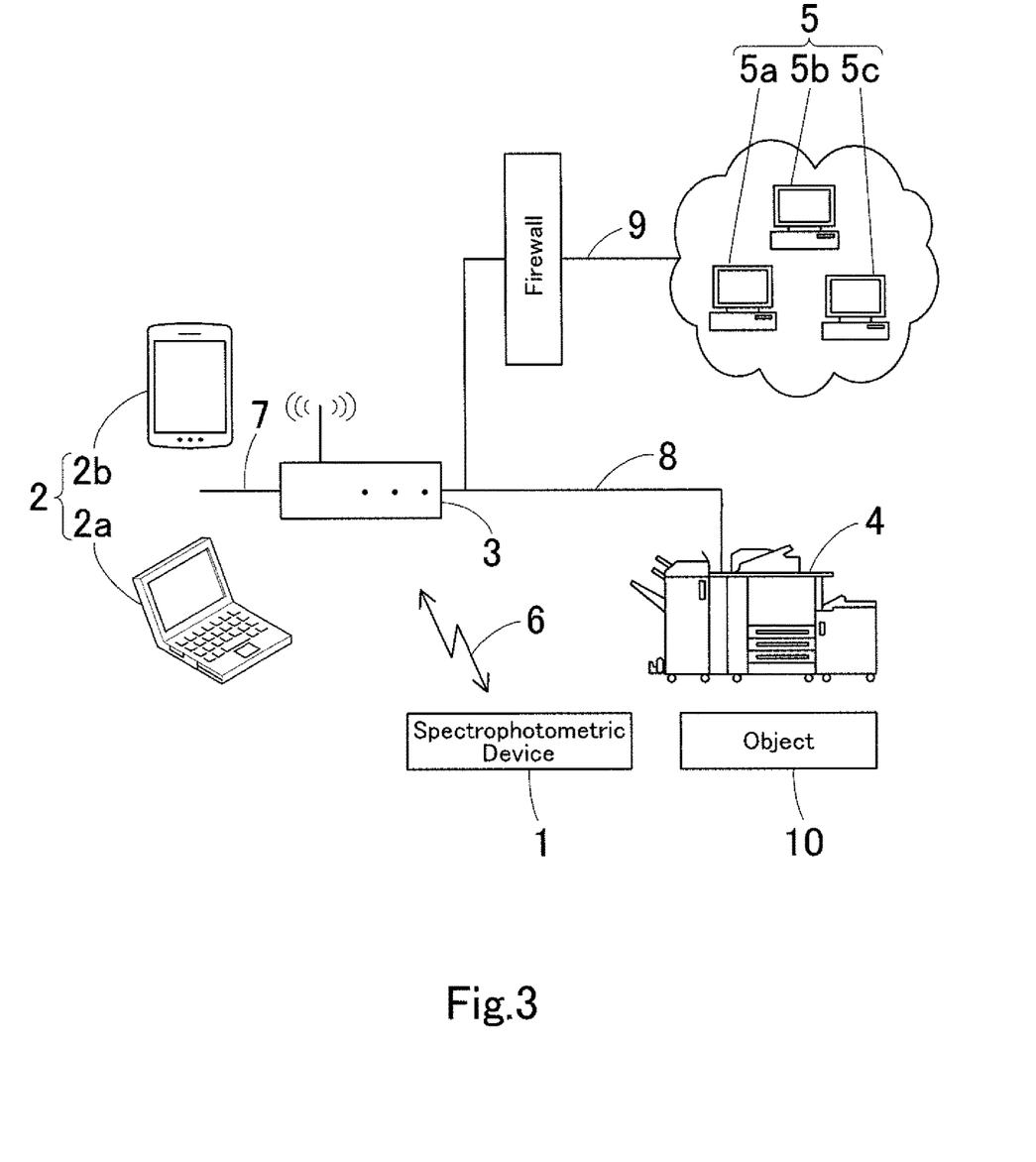
FIG. 3 illustrates a configuration of a network system including the spectrophotometric device of FIG. 1.

FIG. 3 illustrates a configuration of a network system including the spectrophotometric device 1 of FIG. 1. The network system is provided with: a user terminal (also referred to as "user PC") 2 that is constituted by a personal computer (PC); an access point 3; a printer 4; and a cloud server (also referred to as "cloud service" or "cloud" for short) 5, in addition to the spectrophotometric device 1. There may be more than one the user PC 2 (e.g. user PCs 2a and 2b) and more than one the cloud server 5 (e.g. cloud servers 5a to 5c).

Figure 4:
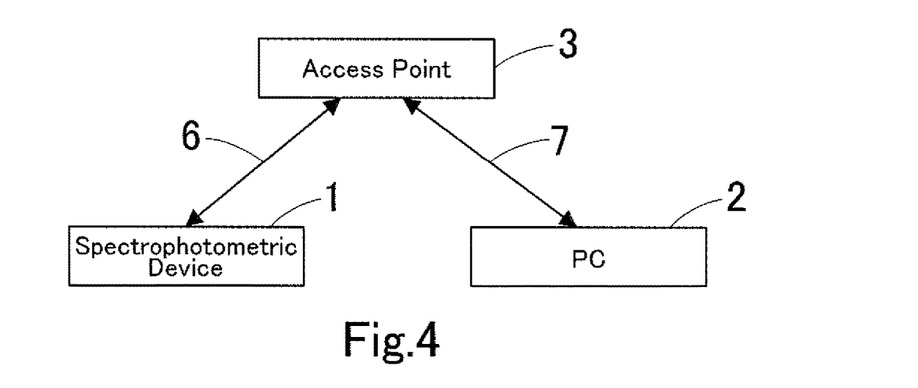
FIG. 4 shows an example of how the spectrophotometric device connects to the target address.
Figure 5:
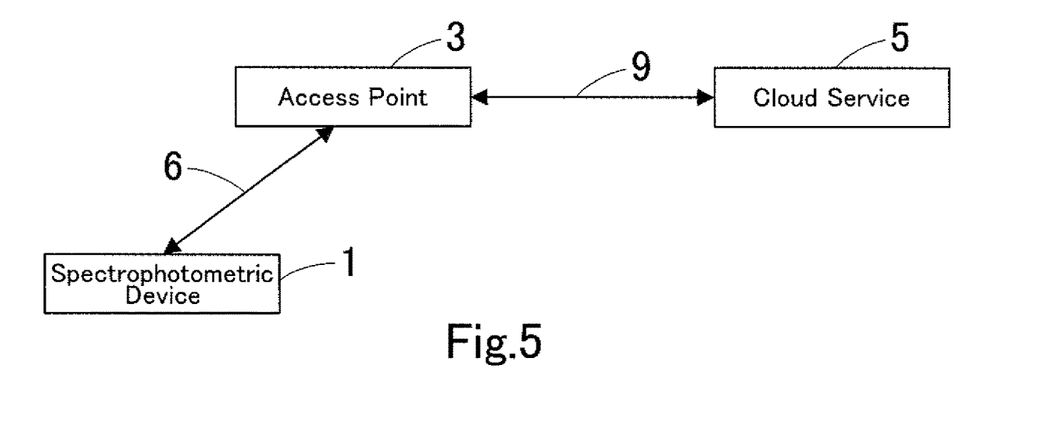
FIG. 5 shows another example of how the spectrophotometric device connects to the target address.
Figure 6:
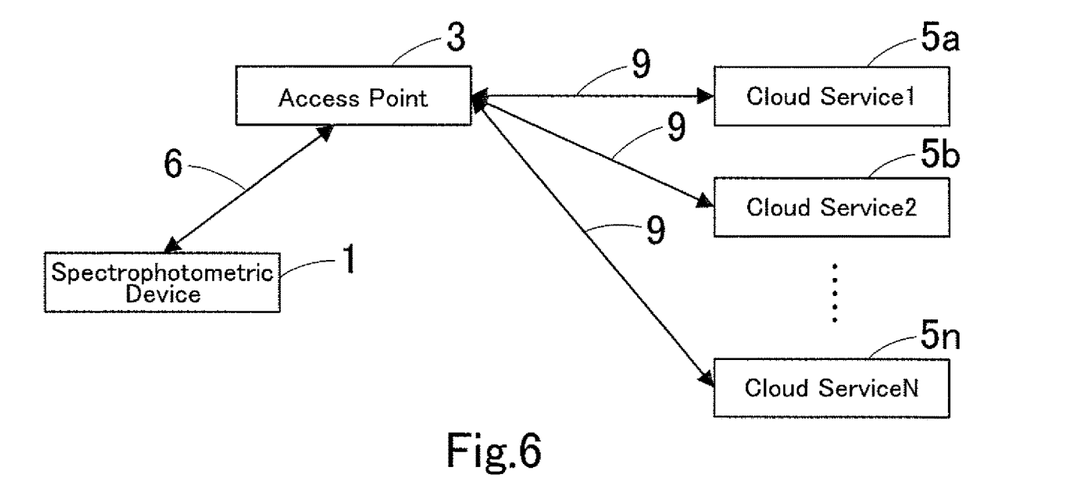
FIG. 6 shows yet another example of how the spectrophotometric device connects to the target address.

The spectrophotometric device 1 is allowed to connect to the user PC 2 by the transmitter-receiver 107, as described above, by way of a wireless LAN 6, the access point 3, and a wired and wireless dual-mode LAN 7 (refer to FIG. 4). The spectrophotometric device 1 is allowed to connect to the cloud server 5 by the transmitter-receiver 107 by way of the wireless LAN 6, the access point 3, and the Internet 9 (refer to FIG. 5). In the case in which there is more than one the cloud server 5, for example, the cloud servers 5a, 5b . . . 5n, the spectrophotometric device 1 is allowed to connect to each of them (refer to FIG. 6). The spectrophotometric device 1 transmits and receives data to and from the user PC 2 and the cloud server 5 via a socket connection or using a protocol such as message queuing telemetry transport (MQTT). The data communication method, however, is not limited to these standards.

The user PC 2 (2a and 2b) is constituted by a laptop or tablet computer, for example. The user PC 2 may be only one; there may be three or more the user PCs 2. The user PC 2 has various applications installed thereon, including a Web application and a setup application for recording the address of the access point 3 and other addresses, for example. With these applications, the user PC 2 is allowed to connect to the spectrophotometric device 1 by way of the wired and wireless dual-mode LAN 7, the access point 3, and the wireless LAN 6. The user PC 2 is further allowed to receive, store, and maintain colorimetric data obtained by the spectrophotometric device 1 and conduct an analysis. In the case in which the spectrophotometric device 1 transmits optical data obtained by the photoreceptor 103 to the user PC 2, the user PC 2 essentially has a computational application installed thereon, which serves to perform computations for color measurement.

The user PC 2 is allowed to connect to the printer 4 by way of the wired and wireless dual-mode LAN 7, the access point 3, and an intranet 8. The user PC 2 is allowed to connect to the cloud server 5 by way of the wired and wireless dual-mode LAN 7, the access point 3, and the Internet 9.

The access point 3 is a base station for allowing the access between a wired and wireless LAN; the access point 3 is constituted by a wireless LAN router, for example.

The printer 4 makes a copy of an object 10. The object 10 is a color test chart for management of the output colors of the printer 4 or a copy for spot metering, for example. The spectrophotometric device 1 scans the color test chart or the copy for spot metering using a ruler not shown in the figure; the spectrophotometric device 1 then measures the colors of it.

The cloud server 5 (5a to 5c) is allowed to connect to the spectrophotometric device 1 by way of the Internet 9, the access point 3, and the wireless LAN 6. The cloud server 5 is further allowed to receive data from color measurement by the spectrophotometric device 1, store the data, maintain the data, and conduct an analysis, which means the cloud server 5 is allowed to conduct unified color management of a plurality of the printers 4.

Hereinafter, how the spectrophotometric device 1 connects to the target address will be described.

[To Connect to Only One Address that is Fixed]

The spectrophotometric device 1 may be configured to connect to only one fixed address and it is the user PC 2a, for example. In this case, the addresses of the access point 3 and the user PC 2a should be previously stored on a recording medium such as the memory 105.

The spectrophotometric device 1 is turned on by the user with the power switch 11. Upon pressing the connect button 12, the CPU 101a of the processor 101 starts operating in accordance with an operation program stored on a recording medium such as the ROM 101b and makes the transmitter-receiver 107 connect to the user PC 2a by way of the access point 3. Being connected, the spectrophotometric device 1 and the user PC 2a identify each other, if necessary, to enable communications using sockets over TCP/IP. The indicator 13 corresponding to the target address blinks to mean connection is in process and stays on to mean connection is currently made, providing a view of the status of connection to the user.

The only one fixed address may be the cloud server 5a, for example. In this case, similar to the other case, the addresses of the access point 3 and the cloud server 5a should be previously stored on a recording medium such as the memory 105. The spectrophotometric device 1 is turned on by the user with the power switch 11; the connection will be soon made mechanically upon pressing the connect button 12.

[To Connect to Between Multiple Addresses]

The spectrophotometric device 1 may be configured to connect to between two or more addresses and they are the user PCs 2, the cloud servers 5, or at least one the user PC 2 and at least one the cloud server 5. In these cases, the two or more addresses and the address of the access point 3 should be previously stored on a recording medium such as the memory 105.

The spectrophotometric device 1 is turned on by the user with the power switch 11. Upon pressing the connect button 12, the CPU 101a makes the transmitter-receiver 107 connect to a different address depending on the behavior pattern in which the user presses the connect button 12. Specifically, the CPU 101a judges the target address on the condition that the connect button 12 has not been pressed for a predetermined period; the CPU 101a then makes the transmitter-receiver 107 connect to the target address by way of the access point 3. Behavior patterns will be later described in detail.

The CPU 101a may switch from one address to another every time when the connect button 12 is pressed. In this case, the CPU 101a fixes the target address on the condition that the connect button 12 has not been pressed for a predetermined period; the CPU 101a then makes the transmitter-receiver 107 connect to the target address by way of the access point 3.

Being connected, the spectrophotometric device 1 and the user PC 2 or the spectrophotometric device 1 and the cloud server 5 identify each other, if necessary, to enable communications using sockets over TCP/IP. The CPU 101a turns on the indicators 13 one by one in sync with the switching of the target address. The indicator 13 corresponding to the target address blinks to mean connection is in process and stays on to mean connection is currently made, providing a view of the status of connection.

In the case in which the spectrophotometric device 1 switches from one address to another every time when the connect button 12 is pressed, the spectrophotometric device 1 may by default connect to one of the available addresses upon turn-on of the power switch 11 then switch the target address as instructed by the user using the connect button 12.

As described above, in this embodiment, the spectrophotometric device 1 allows the user to connect to the target address on the network only by pressing the connect button 12. That is, the spectrophotometric device 1 allows the user to easily and directly connect to the target address such as the user PC 2 or the cloud server 5 without the need of having a sophisticated manipulation or display device. The spectrophotometric device 1 thus allows the sharing of colorimetric data, values to feed back to the printer, date and times of correction, and other information.

As described above, the spectrophotometric device 1 allows the user to connect to the user PC 2 and the cloud server 5 by pressing the connect button 12; conversely, as a matter of course, the user PC 2 and the cloud server 5 allow the user to connect to the spectrophotometric device 1.

Figure 7:
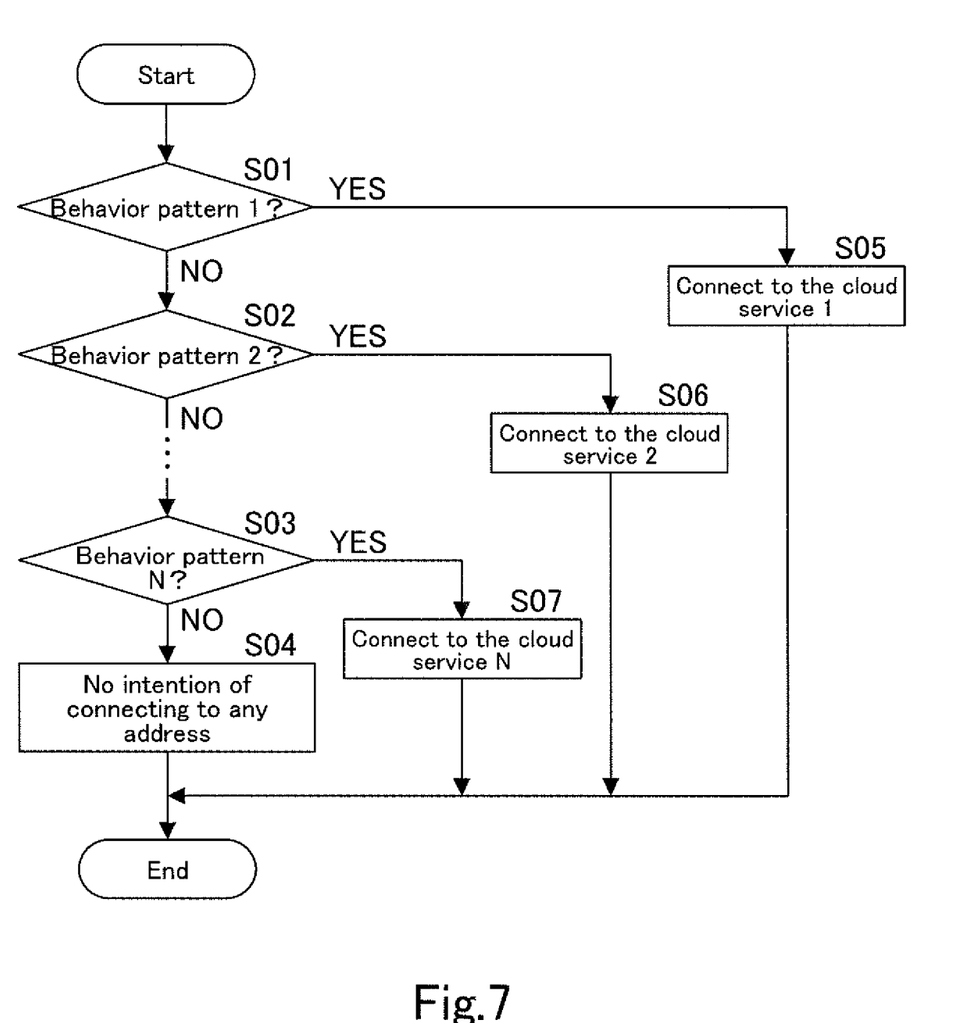
FIG. 7 is a flowchart representing an example of how the spectrophotometric device connects to the target address.

FIG. 7 is a flowchart representing an example of how the spectrophotometric device 1 connects to the target address. In this example, the spectrophotometric device 1 connects to a different address depending on the behavior pattern in which the user presses the connect button 12.

The flowcharts of FIG. 7 and the following figures are executed by the CPU 101a of the processor 101 of the spectrophotometric device 1 in accordance with operation programs stored on a recording medium such as the memory 105.

In Step S01, it is judged whether or not the connect button 12 is pressed in the behavior pattern 1. If it is pressed in the behavior pattern 1 (YES in Step S01), the routine proceeds to Step S05 in which the spectrophotometric device 1 connects to a certain address associated with the behavior pattern 1, which is a cloud service 1 (the cloud server 5a), for example. If it is not pressed in the behavior pattern 1 (NO in Step S01), the routine proceeds to Step S02.

In Step S02, it is judged whether or not the connect button 12 is pressed in the behavior pattern 2. If it is pressed in the behavior pattern 2 (YES in Step S02), the routine proceeds to Step S06 in which the spectrophotometric device 1 connects to a certain address associated with the behavior pattern 2, which is a cloud service 2 (the cloud server 5b), for example. If it is not pressed in the behavior pattern 2 (NO in Step S02), it is further judged whether or not the connect button is pressed in the behavior pattern 3.

The routine reaches Step S03 eventually after repeating these steps; it is judged in Step S03 whether or not the connect button 12 is pressed in the behavior pattern N. If it is pressed in the behavior pattern N (YES in Step S03), the routine proceeds to Step S07 in which the spectrophotometric device 1 connects to a certain address associated with the behavior pattern N, which is a cloud service N (the cloud server 5n), for example. If it is not pressed in the behavior pattern N (NO in Step S03), then it is judged in Step S04 that there is no intention of connecting to any address; the routine then terminates.

Figure 10:
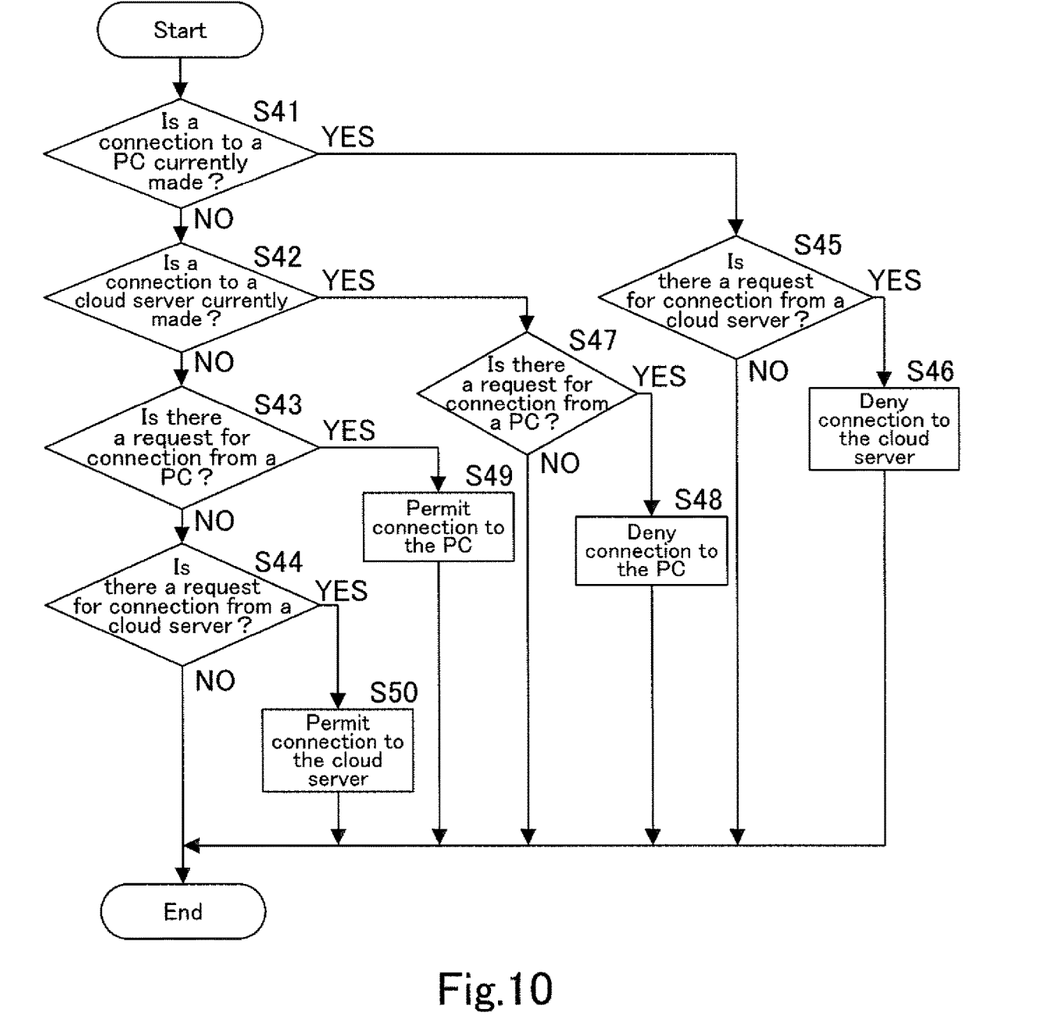
FIG. 10 is a flowchart representing still yet another example of how the spectrophotometric device connects to the target address.

FIG. 10 is a flowchart representing still yet another example of how the spectrophotometric device 1 connects to the target address.

In this example, the spectrophotometric device 1 denies connection to the cloud server 5 if a connection to the user PC 2 (referred to as "application" in FIG. 8) is currently made.

Figure 8:
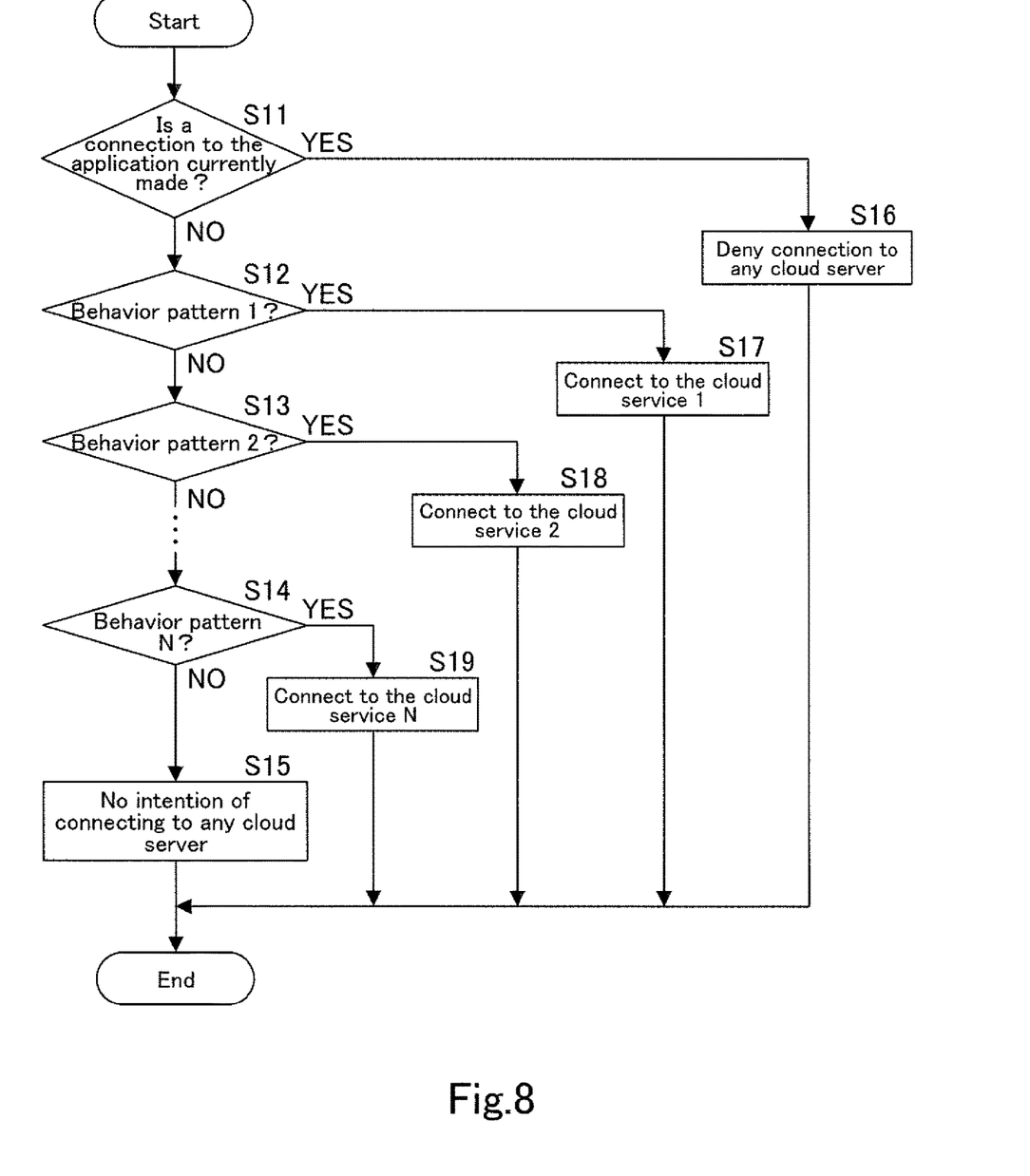
FIG. 8 is a flowchart representing another example of how the spectrophotometric device connects to the target address.

In Step S11, it is judged whether or not a connection to the user PC 2 is currently made. If it is currently made (YES in Step S11), the spectrophotometric device 1 denies connection to the cloud server 5 in Step S16. The spectrophotometric device 1 according to this embodiment does not have a sophisticated display device, not providing an at-a-glance view of the target address and the status of the connection. Judging whether or not a connection to a specific address is currently made is a solution to this problem.

In this embodiment, the spectrophotometric device 1 denies connection by assigning an error code, for example, that indicates the existence of another connection currently made; this embodiment, however, should not be limited to this example.

If a connection to the user PC 2 is not currently made (NO in Step S11), it is further judged in Step S12 whether or not the connect button 12 is pressed in the behavior pattern 1. If it is pressed in the behavior pattern 1 (YES in Step S12), the routine proceeds to Step S17 in which the spectrophotometric device 1 connects to a certain address associated with the behavior pattern 1, which is the cloud service 1 (the cloud server 5a), for example. If it is not pressed in the behavior pattern 1 (NO in Step S12), the routine proceeds to Step S13.

In Step S13, it is judged whether or not the connect button 12 is pressed in the behavior pattern 2. If it is pressed in the behavior pattern 2 (YES in Step S13), the routine proceeds to Step S18 in which the spectrophotometric device 1 connects to a certain address associated with the behavior pattern 2, which is the cloud service 2 (the cloud server 5b), for example. If it is not pressed in the behavior pattern 2 (NO in Step S13), it is further judged whether or not the connect button is pressed in the behavior pattern 3.

The routine reaches Step S14 eventually after repeating these steps; it is judged in Step S14 whether or not the connect button 12 is pressed in the behavior pattern N. If it is pressed in the behavior pattern N (YES in Step S14), the routine proceeds to Step S19 in which the spectrophotometric device 1 connects to a certain address associated with the behavior pattern N, which is the cloud service N (the cloud server 5n), for example. If it is not pressed in the behavior pattern N (NO in Step S14), then it is judged in Step S15 that there is no intention of connecting to the cloud server 5; the routine then terminates.

In the above-described example of FIG. 8, the spectrophotometric device 1 denies connection to the cloud server 5 if a connection to the user PC 2 is currently made. Alternatively, the spectrophotometric device 1 may deny connection to the user PC 2 if a connection to the cloud server 5 is currently made. This means, the spectrophotometric device 1 is allowed to connect exclusively to either the user PC 2 or the cloud server 5.

Figure 9:
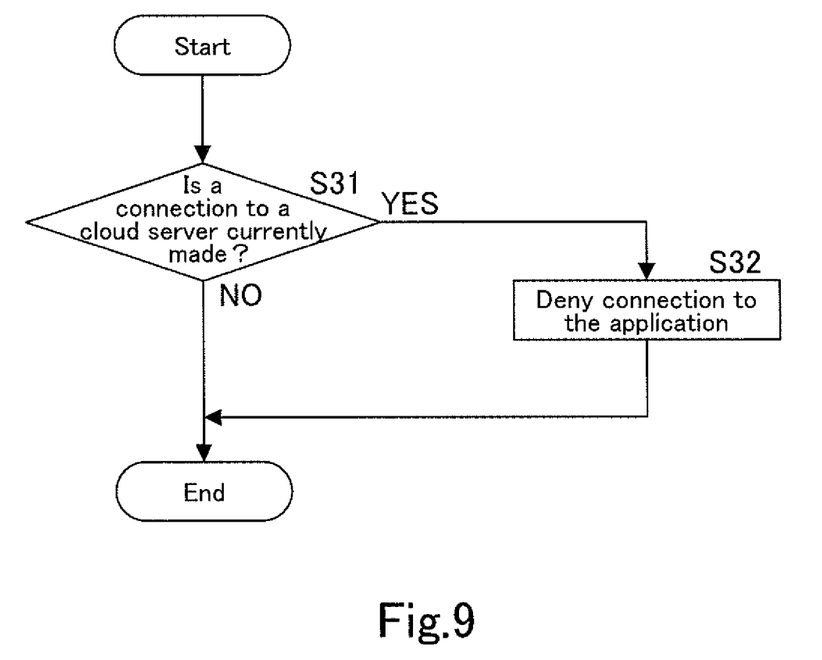
FIG. 9 is a flowchart representing yet another example of how the spectrophotometric device connects to the target address.

FIG. 9 refers to this alternative example. In Step S31 of FIG. 9, it is judged whether or not a connection to the cloud server 5 is currently made. If it is currently made (YES in Step S31), the spectrophotometric device 1 denies connection to the user PC 2 in Step S32. As described above, the spectrophotometric device 1 does not have a sophisticated display device, not providing an at-a-glance view of the target address and the status of the connection. Judging whether or not a connection to a specific address, the cloud server 5, is currently made is a solution to this problem.

If a connection to the cloud server 5 is not currently made (NO in Step S31), the flowchart terminates.

In the case in which there is more than one the user PC 2 and each user PC 2 is associated with one behavior pattern, the spectrophotometric device 1 may establish a connection as described below. Similar to the example of FIG. 8, if a connection to the cloud server 5 is not currently made (NO in Step S11), it is judged whether or not the connect button 12 is pressed in the behavior patterns. If it is pressed in any of the behavior patterns, the spectrophotometric device 1 connects to the user PC 2 associated with that behavior pattern; if it is not pressed in any of the behavior patterns, the routine terminates because there is no intention of connecting to any address.

FIG. 10 is a flowchart representing still yet another example of how the spectrophotometric device 1 connects to the target address.

In Step S41, it is judged whether or not a connection to the user PC 2 is currently made. If it is currently made (YES in Step S41), it is further judged in Step S45 whether or not there is a request for connection from the cloud server 5. If there is such a request (YES in Step S45), the spectrophotometric device 1 denies connection from the cloud server 5 in Step S46. If there is no such request (NO in Step S45), the routine terminates.

Back to Step S41, if a connection to the user PC 2 is not currently made (NO in Step S41), it is then judged in Step S42 whether or not a connection to the cloud server 5 is currently made. If it is currently made (YES in Step S42), it is further judged in Step S47 whether or not there is a request for connection from the user PC 2. If there is such a request (YES in Step S47), the spectrophotometric device 1 denies connection from the user PC 2 in Step S48. If there is no such request (NO in Step S47), the routine terminates.

Back to Step S42, if a connection to the cloud server 5 is not currently made (NO in Step S42), it is further judged in Step S43 whether or not there is a request for connection from the user PC 2. If there is such a request (YES in Step S43), the spectrophotometric device 1 permits connection to the user PC 2 in Step S49. If there is no such request (NO in Step S43), the the routine proceeds to Step S44.

In Step S44, it is judged whether or not there is a request for connection from the cloud server 5. If there is such a request (YES in Step S44), the spectrophotometric device 1 permits connection to the cloud server 5 in Step S50. If there is no such request (NO in Step S44), the routine terminates.

Figure 11A:
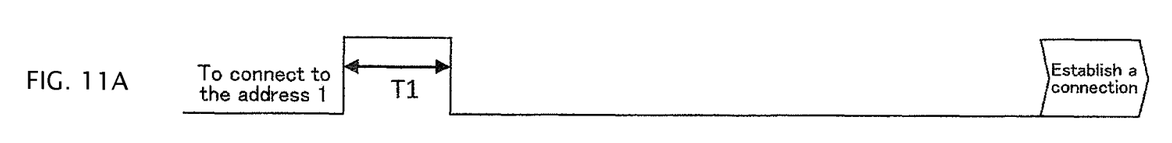
FIGS. 11A, 11B, and 11C are views for reference in describing an example of a behavior pattern in which a connection interface element is used.
Figure 11B:
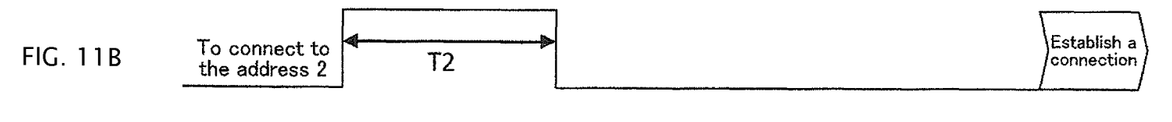
Figure 11C:
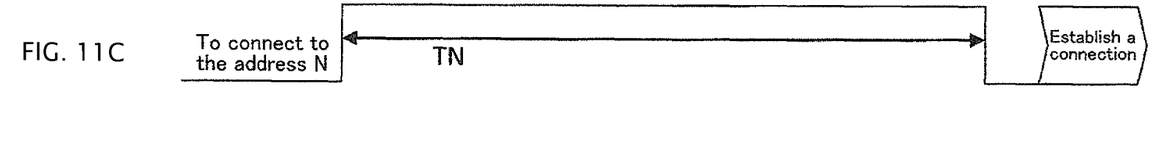

FIGS. 11A, 11B, and 11C are views for reference in describing an example of a behavior pattern in which the connect button 12 is pressed. In the example of FIGS. 11A, 11B, and 11C, a behavior pattern is defined as a period in which the connect button 12 is pressed and held down i.e. an "on" period of the connect button 12; and the spectrophotometric device 1 selects a different address depending on the behavior pattern.

Specifically, the CPU 101a calculates the period between the start and end times of pressing of the connect button 12. As referred to FIG. 11A, if it is longer than a predetermined period T1 and shorter than a predetermined period T2, the spectrophotometric device 1 connects to an address 1; as referred to FIG. 11B, if it is longer than the predetermined period T2 and shorter than a predetermined period T3, the spectrophotometric device 1 connects to an address 2; as referred to FIG. 11C, if it is longer than a predetermined period TN and shorter than a predetermined upper limit, the spectrophotometric device 1 connects to an address N.

Figure 12A:
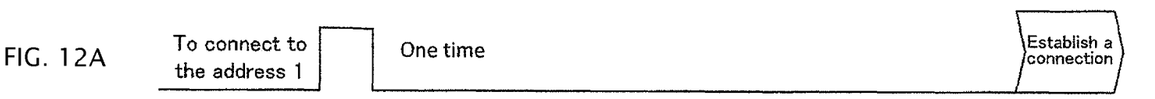
FIGS. 12A, 12B, and 12C are views for reference in describing another example of a behavior pattern in which the connection interface element is used.
Figure 12B:
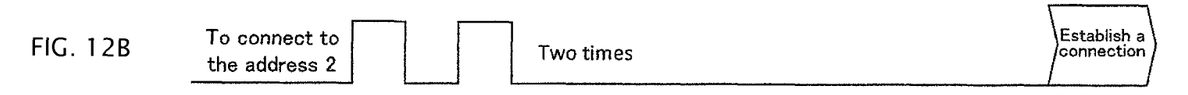
Figure 12C:
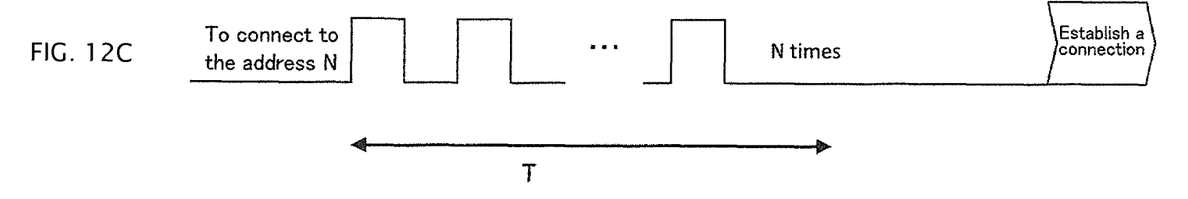

FIGS. 12A, 12B, and 12C are views for reference in describing another example of a behavior pattern in which the connect button 12 is pressed. In the example of FIGS. 12A, 12B, and 12C, a behavior pattern is defined as the number of times the connect button 12 has been pressed in a predetermined period i.e. the number of times the connect button 12 has been turned on in a predetermined period; and the spectrophotometric device 1 selects a different address depending on the behavior pattern.

Specifically, the CPU 101a counts the number of times the connect button 12 has been turned on and held down for more than a predetermined period, within a certain period that is shorter than a predetermined period T. As referred to FIG. 12A, if it is one time, the spectrophotometric device 1 connects to the address 1; as referred to FIG. 12B, if it is two times, the spectrophotometric device 1 connects to the address 2; as referred to FIG. 12C, if it is N times, the spectrophotometric device 1 connects to the address N.

The predetermined period T may be set to a variable value instead of a fixed value; the predetermined period T may forcibly end after a certain "off" period of the connect button 12.

Figure 13:
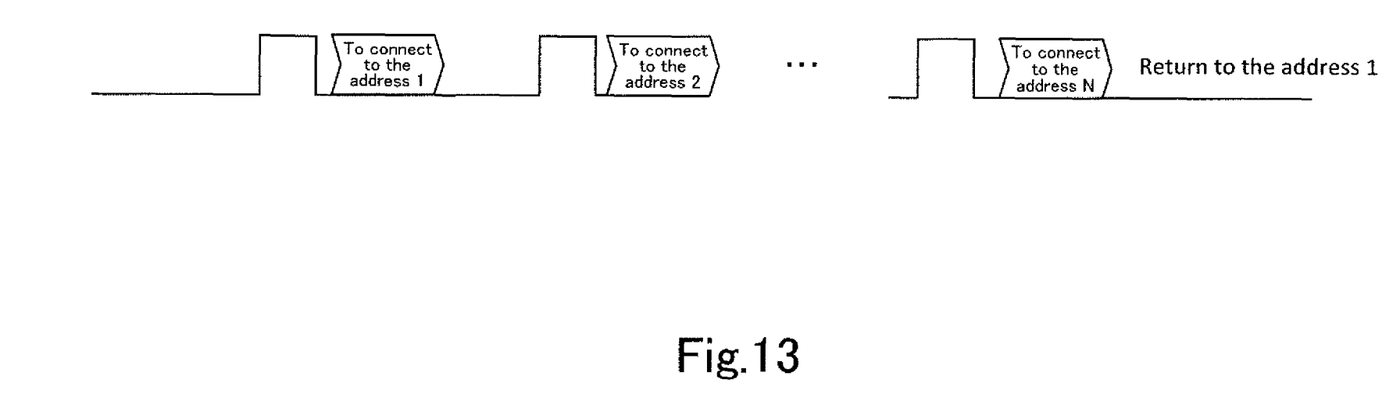
FIG. 13 is a view for reference in describing yet another example of a behavior pattern in which the connection interface element is used.

FIG. 13 is a view for reference in describing yet another example of a behavior pattern in which the connect button 12 is pressed. In the example of FIG. 12, the spectrophotometric device 1 switches from one address to another every time when the connect button 12 is pressed and turned on.

For example, the spectrophotometric device 1 connects to the address 1 first then switches to the address 2. As referred to FIG. 13, when the connect button 12 is pressed and turned on, the spectrophotometric device 1 connects to the address 1, then when the connect button 12 is pressed and turned on again, the spectrophotometric device 1 connects to the address 2. Similarly, since then, the spectrophotometric device 1 switches from one address to another every time when the connect button 12 is pressed and turned on. The spectrophotometric device 1 restarts with the address 1 after the address N.

Using the connect button 12, the user can thus easily switch the target address.

There may be more than one the connect button 12; in this case, the user switches the target address using the multiple connect buttons 12.

Figure 14:
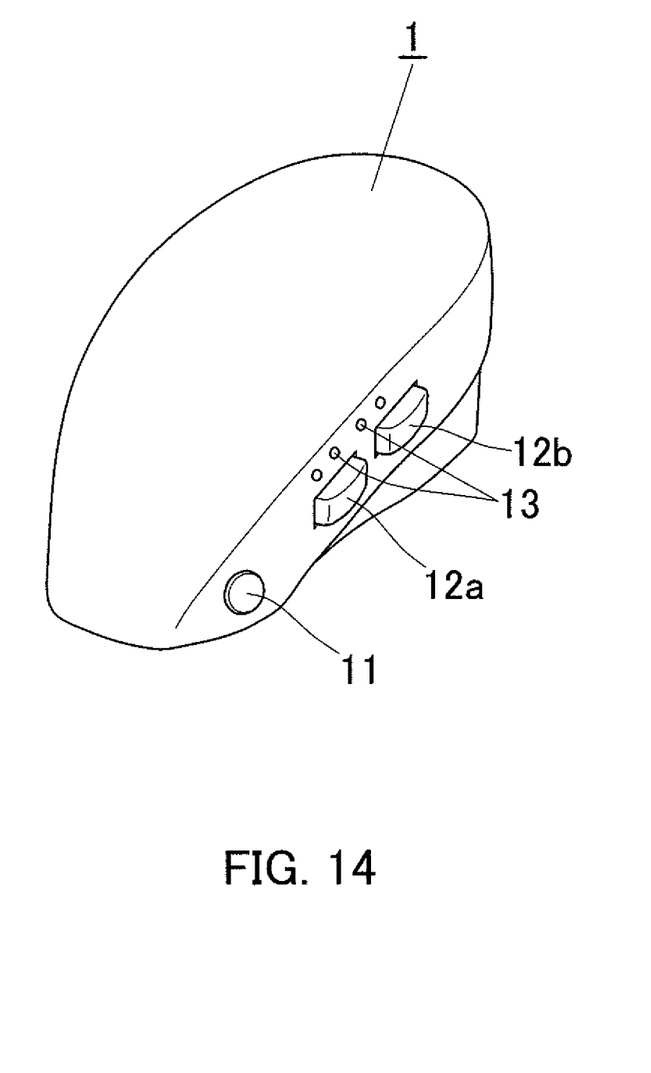
FIG. 14 is a perspective view illustrating the exterior of a spectrophotometric device according to another embodiment of the present invention.
Figure 15A:
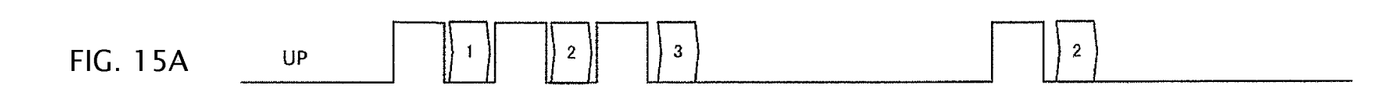
FIGS. 15A and 15B are views for reference in describing still yet another example of a behavior pattern in which the connection interface element is used.
Figure 15B:
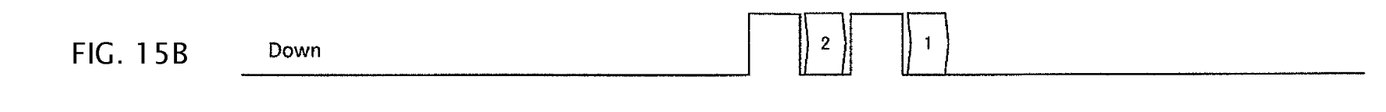

For example, as referred to FIG. 14, the spectrophotometric device 1 is provided with two the connect buttons 12 which are a first connect button 12a and a second connect button 12b. As referred to FIG. 15A, when the first connect button 12a is pressed and turned on, the spectrophotometric device 1 connects to the address 1, then when the first connect button 12a is pressed and turned on again, the spectrophotometric device 1 connects to the address 2. Similarly, since then, the spectrophotometric device 1 switches from one address to another every time when the first connect button 12a is pressed and turned on. Meanwhile, as referred to FIG. 15B, when the second connect button 12b is pressed, the spectrophotometric device 1 connects to the previous address. For example, when the first connect button 12a is pressed, the spectrophotometric device 1 connects to the address 3. After that, when the second connect button 12b is pressed, the spectrophotometric device 1 connects to the address 2, then when the second connect button 12b is pressed again, the spectrophotometric device 1 connects to the address 1. After that, when the first connect button 12a is pressed, the spectrophotometric device 1 connects to the next address, the address 2.

Using the first connect button 12a and the second connect button 12b, the user can thus easily switch the target address.

In the following methods, for example, the user conducts color measurement by operating the spectrophotometric device 1 and corrects and manages the output colors of the printer 4 by operating the user PC 2 and the cloud server 5.

[1] To correct the output colors of the printer 4 or build a profile for the printer 4 by operating the user PC 2

By operating the spectrophotometric device 1, the user establishes a connection between the spectrophotometric device 1 and the user PC 2 via a network such as a wireless LAN. The user PC 2 has special application software installed.

By operating this application, the user specifies the printer 4 as a target for color correction and makes it print a color test chart for color correction or profile building, which is the object 10.

By operating the application installed on the PC 2, the user further gives an instruction for color correction or profile building to the spectrophotometric device 1 to make it scanning. Specifically, the user sets a ruler and the spectrophotometric device 1 in position on the color test chart for color correction or profile building and presses a scan start button not shown in the figure, for example; the spectrophotometric device 1 starts scanning accordingly.

Upon completion of scanning, the spectrophotometric device 1 transmits the colorimetric results obtained from the color patches to the user PC 2. The user PC 2 calculates the gap between the colorimetric result and the designated value about each color patch and calculates a correction coefficient for the printer 4. The user PC 2 applies the correction coefficient to correct and manage the output colors of the printer 4.

Alternatively, in the case of profile building, the user PC 2 accumulates multiple records of the relation between the colorimetric result and the designated value about each color patch, then build a profile for the printer 4.

Meanwhile, the user PC 2 may transfer the colorimetric values, the correction coefficient, and other information to the cloud server 5 such that the cloud server 5 maintains color information of the printer 4. In this case, a person in charge of color management can manage the output colors of more than one the printer 4 by operating one the cloud server 5.

[2] To correct the output colors of the printer 4 by operating a Web browser of the user PC 2

By operating a Web browser installed on the user PC 2, the user connects to the cloud server. Thus, the user can use the functions of the cloud server 5 in an operating system (OS) independent environment which does not require special application software installed on the user PC 2.

By operating an application installed on the cloud server 5, the user specifies the spectrophotometric device 1 by entering or selecting its IP address, name, or serial number, for example, from a history or a list in a combo box. By operating the application installed on the cloud server 5, the user further specifies the printer 4 as a target for color correction.

By operating the application installed on the cloud server 5, the user further enters measurement conditions (type of correction, measurement method, and definition data) and downloads the measurement conditions onto the user PC 2.

Subsequently, the user makes the printer 4 print a color test chart. The color test chart is downloaded from the cloud server 5.

By operating the application installed on the cloud server 5, the user further gives an instruction for color measurement to the spectrophotometric device 1 to make it scanning. Specifically, the user sets a ruler and the spectrophotometric device 1 in position on the color test chart for color correction or profile building and presses a scan start button not shown in the figure, for example; the spectrophotometric device 1 starts scanning accordingly.

Upon completion of scanning, the spectrophotometric device 1 transmits scan results to the cloud server 5. The cloud server 5 recognizes each color patch and obtains density information therefrom.

The user stores the colorimetric results, which are obtained from the color test chart, onto the cloud server 5 along with the measurement conditions and date of measurement. The user can view pass/fail results on the Web browser. The spectrophotometric device 1 may be further provided with a status lamp for indicating pass/fail results.

Although one or more embodiments of the present invention have been described and illustrated in detail, the disclosed embodiments are made for purposes of illustration and example only and not limitation. The scope of the present invention should be interpreted by terms of the appended claims.

What is claimed is:

1. A spectrophotometric device comprising a photoreceptor that receives light reflected from an object, the spectrophotometric device for measuring a color of the object, the spectrophotometric device further comprising:

a network connector configured to connect to one selected from the group consisting of: (a) only one fixed address; and (b) more than one address on a network;

a connection interface having at least one interface element as a connection button configured to be manually operated by a user; and a processor configured to make the network connector switch a connection condition from a first server on the network to a second server on the network upon the interface element being manually operated by the user.

2. The spectrophotometric device according to claim 1, wherein:

the network connector connects to the more than one address on the network; and there is only one instance of the interface element.

3. The spectrophotometric device according to claim 1, wherein:

the network connector connects to the more than one address on the network; and there is more than one interface element.

4. The spectrophotometric device according to claim 2, wherein the processor makes the network connector connect to an address associated with a behavior pattern, the behavior pattern being caused by the user manually operating the one interface element.

5. The spectrophotometric device according to claim 4, wherein the behavior pattern is defined as a period of the one interface element being manually pressed and held down by the user.

6. The spectrophotometric device according to claim 4, wherein the behavior pattern is defined as the number of times the one interface element has been manually pressed and held down by the user in a predetermined period.

7. The spectrophotometric device according to claim 1, further comprising a recorder that records address information of the one fixed or the more than one address on the network.

8. The spectrophotometric device according to claim 1, wherein the processor makes the network connector deny connection to a server if connection to a user terminal is currently made.

9. The spectrophotometric device according to claim 1, wherein the processor makes the network connector deny connection to a user terminal if connection to a server is currently made.

10. The spectrophotometric device according to claim 1, wherein the network connector is a wireless network connector.

* * * * *